(12) United States Patent
Kuroda

(10) Patent No.: US 10,836,123 B2
(45) Date of Patent: Nov. 17, 2020

(54) MANUFACTURING METHOD FOR COMPOSITE MATERIAL AND MANUFACTURING APPARATUS FOR COMPOSITE MATERIAL

(71) Applicant: NISSAN MOTOR CO., LTD., Yokohama (JP)

(72) Inventor: Shinichi Kuroda, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 15/757,798

(22) PCT Filed: Sep. 9, 2015

(86) PCT No.: PCT/JP2015/075648
§ 371 (c)(1),
(2) Date: Mar. 6, 2018

(87) PCT Pub. No.: WO2017/042921
PCT Pub. Date: Mar. 16, 2017

(65) Prior Publication Data
US 2018/0250893 A1    Sep. 6, 2018

(51) Int. Cl.
*B29C 70/48* (2006.01)
*B29B 11/16* (2006.01)
(Continued)

(52) U.S. Cl.
CPC .............. *B29C 70/48* (2013.01); *B29B 11/16* (2013.01); *B29C 39/24* (2013.01); *B29C 39/38* (2013.01);
(Continued)

(58) Field of Classification Search
CPC ........ B29B 11/16; B29C 70/48; B29C 70/546; B29C 70/548; B29C 70/443;
(Continued)

(56) References Cited

U.S. PATENT DOCUMENTS 4,946,640 A * 8/1990 Nathoo ................. B29C 51/082
264/316
4,954,196 A * 9/1990 De Hoff ............... C08G 59/182
156/169
(Continued)

FOREIGN PATENT DOCUMENTS

JP  4-240256 A  8/1992
JP  5-185539 A  7/1993
(Continued)

*Primary Examiner* — Michael A Tolin
(74) *Attorney, Agent, or Firm* — Foley & Lardner LLP

(57) ABSTRACT

A method of manufacturing a composite material 400 provided with a reinforcement 510 and a resin 600 infused into the reinforcement, includes: an applying process of applying an adhesive 520 to the sheet-shaped reinforcement having first and second regions 501 and 502 such that a content density of the adhesive of the second region is lower than that of the first region; a preforming process of forming a preform 500 by preforming the reinforcement; and a process of molding a composite material 400 by infusing the resin 600 into the preform. The resin injected into the cavity easily flows in a portion of the cavity 350 where the second region of the reinforcement is placed, compared to a portion of the cavity where the first region of the reinforcement is placed.

16 Claims, 12 Drawing Sheets

(51) Int. Cl.
  *B29C 70/54* (2006.01)
  *B29C 70/44* (2006.01)
  *B29C 39/24* (2006.01)
  *B29C 39/38* (2006.01)

(52) U.S. Cl.
  CPC .......... *B29C 70/443* (2013.01); *B29C 70/546* (2013.01); *B29C 70/547* (2013.01); *B29C 70/541* (2013.01); *B32B 2262/106* (2013.01)

(58) Field of Classification Search
  CPC ... B29C 70/446; B29C 70/541; B29C 70/543; B29C 70/547
  See application file for complete search history.

(56) References Cited

U.S. PATENT DOCUMENTS

| | | | |
|---|---|---|---|
| 5,418,035 A | 5/1995 | Iguchi et al. | |
| 10,272,620 B2 * | 4/2019 | Chujo | B29C 70/48 |
| 2002/0117252 A1 * | 8/2002 | Baldwin | B29B 11/16 |
| | | | 156/178 |
| 2004/0140587 A1 * | 7/2004 | Hadley | B29C 35/0266 |
| | | | 264/257 |
| 2007/0023975 A1 * | 2/2007 | Buckley | B29B 11/16 |
| | | | 264/494 |
| 2010/0108245 A1 | 5/2010 | Nishiyama et al. | |
| 2013/0328236 A1 | 12/2013 | Yamamoto et al. | |
| 2016/0339648 A1 | 11/2016 | Yamamoto et al. | |

FOREIGN PATENT DOCUMENTS

| | | |
|---|---|---|
| JP | 6-218730 A | 8/1994 |
| JP | 11-058536 | 3/1999 |
| JP | 2005-193587 A | 7/2005 |
| JP | 2006-192745 A | 7/2006 |
| JP | 2006-256202 A | 9/2006 |
| JP | 2008-88276 A | 4/2008 |
| KR | 1020140006856 A | 1/2014 |
| WO | WO 2008/114809 A1 | 9/2008 |

* cited by examiner

US 10,836,123 B2

MANUFACTURING METHOD FOR COMPOSITE MATERIAL AND MANUFACTURING APPARATUS FOR COMPOSITE MATERIAL

TECHNICAL FIELD

The present invention relates to a manufacturing method for a composite material and a manufacturing apparatus for a composite material.

BACKGROUND ART

In recent years, in order to manufacture a lightweight vehicle, a composite material obtained by infusing resin into a reinforcement has been employed as a material for an automobile component. A resin transfer molding (RTM) method has been focused as a manufacturing method for a composite material well-suited for mass production.

In the RTM method, first, a reinforcement is laminated, and a preform preformed in a predetermined shape is disposed in a cavity of the mold. After the mold is closed, resin is injected from an injection port to the cavity to infuse resin to the reinforcement. In addition, the resin injected into the cavity is cured to finally obtain a composite material. In the middle of resin injection, a clamping pressure is applied using a predetermined press machine in order to prevent an unwanted mold opening caused by a pressure increase inside the cavity (see Patent Literature 1).

CITATION LIST

Patent Literatures

Patent Literature JP 2001-1935837 A

SUMMARY OF INVENTION

Technical Problem

In the molding method for the composite material described above, the resin injected into the cavity flows while spreading in the cavity. Therefore, the resin moves from a region where the resin easily flows such as the vicinity of the injection port of the preform placed in the cavity toward a region where the resin does not easily flow, such as a peripheral edge of the preform. The injected resin passes through the reinforcement by infusion while it flows inside the cavity. Therefore, a long time is necessary in the injection in order to allow the resin to reach the region where the resin does not easily flow. This increases the molding time. For this real, in order to inject the resin within a short time, it is necessary to set the injection pressure to a high pressure. Therefore, a large-sized press machine capable of applying a higher clamping pressure is to be employed. In addition, equipment for injecting the resin is also necessary to have high performance to allow high-pressure injection. Therefore, the equipment cost also increases because of the use of the high-pressure injection equipment.

Accordingly, in order to solve the aforementioned problems, an object of the invention is to provide a manufacturing method for a composite material and a manufacturing apparatus for a composite material, capable of reducing a molding time and an equipment cost by controlling floating of resin in a cavity.

Solution to Problem

In order to achieve the aforementioned object, the invention provides a manufacturing method for a composite material provided with a reinforcement and resin infused into the reinforcement. The manufacturing method for the composite material includes: applying an adhesive to the sheet-shaped reinforcement having first and second regions such that a content density of the adhesive of the second region is lower than that of the first region; forming a preform by preforming the reinforcement; placing the preform in a cavity of a mold such that the first region is placed in the vicinity of the injection port of the mold relative to the second region; and injecting the resin into the cavity from an injection port of the mold to infuse the resin into the preform and mold the composite material. The resin injected into the cavity easily flows in a portion of the cavity where the second region of the reinforcement is placed, compared to a portion of the cavity where the first region of the reinforcement is placed.

In order to achieve the aforementioned object, the invention provides a manufacturing apparatus for a composite material including: an applying unit configured to apply an adhesive to a sheet-shaped reinforcement having first and second regions; a preform die configured to form a preform by preforming the reinforcement; a mold configured to form a cavity where the preform is placed and provided with an injection port for injecting resin into the cavity; and a control unit configured to control operation of the applying unit and the preform die. The control unit controls operation of the applying unit for applying the adhesive such that a content density of the adhesive is lower in the second region of the reinforcement relative to the first region of the reinforcement, and the first region is placed in the vicinity of the injection port of the mold relative to the second region while the preform is placed in the cavity of the mold.

BRIEF DESCRIPTION OF DRAWINGS

FIGS. 2A and 2B are diagrams illustrating a preforming apparatus for forming a preform according to an embodiment of the invention, in which FIG. 2A is a schematic perspective view illustrating an applying unit, and FIG. 2B is a schematic perspective view illustrating a heater.

FIGS. 3A and 3B are diagrams illustrating a preforming apparatus for forming a preform according to an embodiment of the invention, in which FIG. 3A is a schematic perspective view illustrating a cutting unit, and FIG. 3B is a schematic perspective view illustrating a preform die.

FIGS. 6A to 6C are conceptual diagrams for describing a principle of the invention to illustrate a state of the resin flowing between laminate layers of a reinforcement as seen from a side direction, in which FIG. 6A is a diagram illustrating a state of the preform according to an embodiment of the invention, FIG. 6B is a diagram illustrating a state of the resin infused into the preform according to an embodiment of the invention, and FIG. 6C is a diagram illustrating a state of the resin infused into a preform of a comparative example.

FIGS. 7A and 7B are conceptual diagrams for describing a principle of the invention to illustrate a state of the resin flowing inside the mold in which the reinforcement is placed as seen from the top, in which FIG. 7A is a diagram illustrating a state of the resin infused into the preform according to an embodiment of the invention, and FIG. 7B is a diagram illustrating a state of the resin injected into a preform of a comparative example.

FIGS. 8A and 8B are photographs illustrating an evaluation result for a misalignment state of the orientation in the reinforcement caused by flowing of resin, in which FIG. 8A illustrates a state of the resin flowing to the preform according to an embodiment of the invention, and FIG. 8B illustrates a state of the resin flowing to the preform of the comparative example.

FIGS. 12A and 12B are diagrams illustrating an automobile component manufactured by applying a manufacturing method for a composite material according to an embodiment of the invention, in which FIG. 12A is a diagram illustrating various automobile components obtained by using a composite material, and FIG. 12B is a diagram illustrating a car body formed by assembling the automobile components.

DESCRIPTION OF EMBODIMENTS

Figure 1:
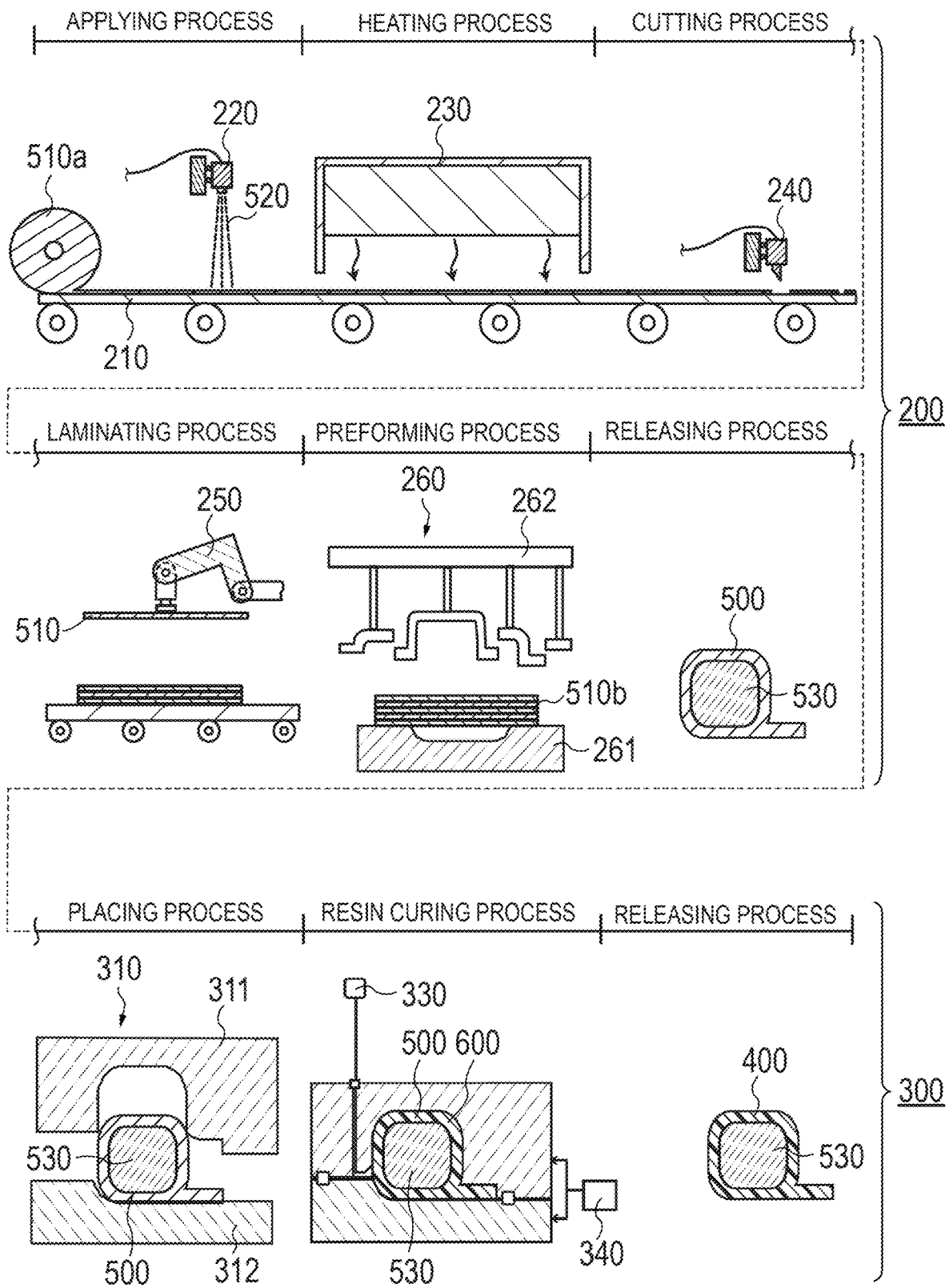
FIG. 1 is a diagram illustrating a manufacturing apparatus for a composite material and a whole flow of a manufacturing method for a composite material according to an embodiment of the invention.

Embodiments of the present invention will now be described with reference to the accompanying drawings. Note that the following description is not intended to limit the technical scope and meanings of terminologies described in claims. In addition, scales or dimensions in the drawings may be exaggerated differently from actual ones depending on situations in some times.

Figure 4:
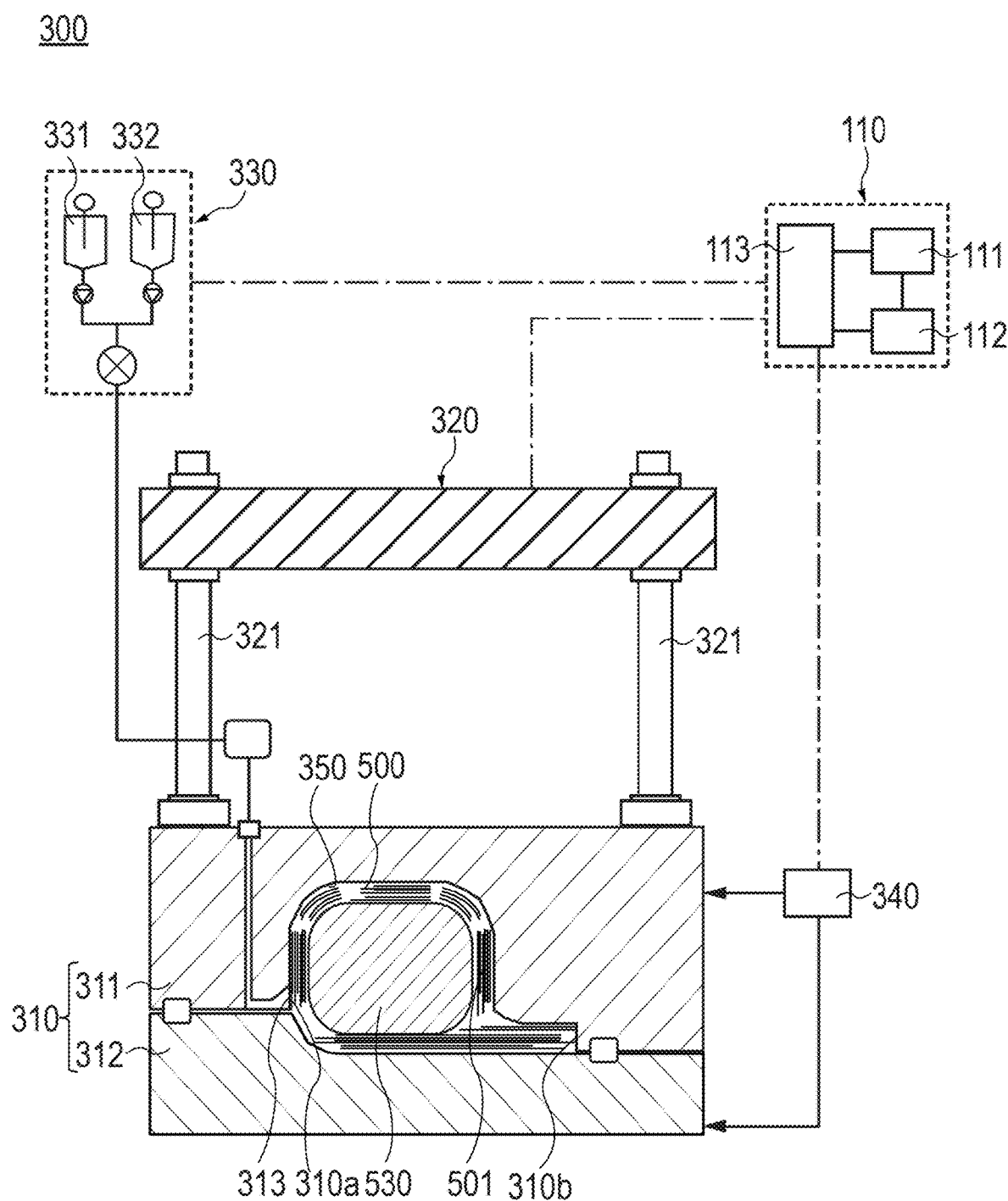
FIG. 4 is a schematic diagram illustrating a molding apparatus for molding a composite material using the preform according to an embodiment of the invention.
Figure 5:
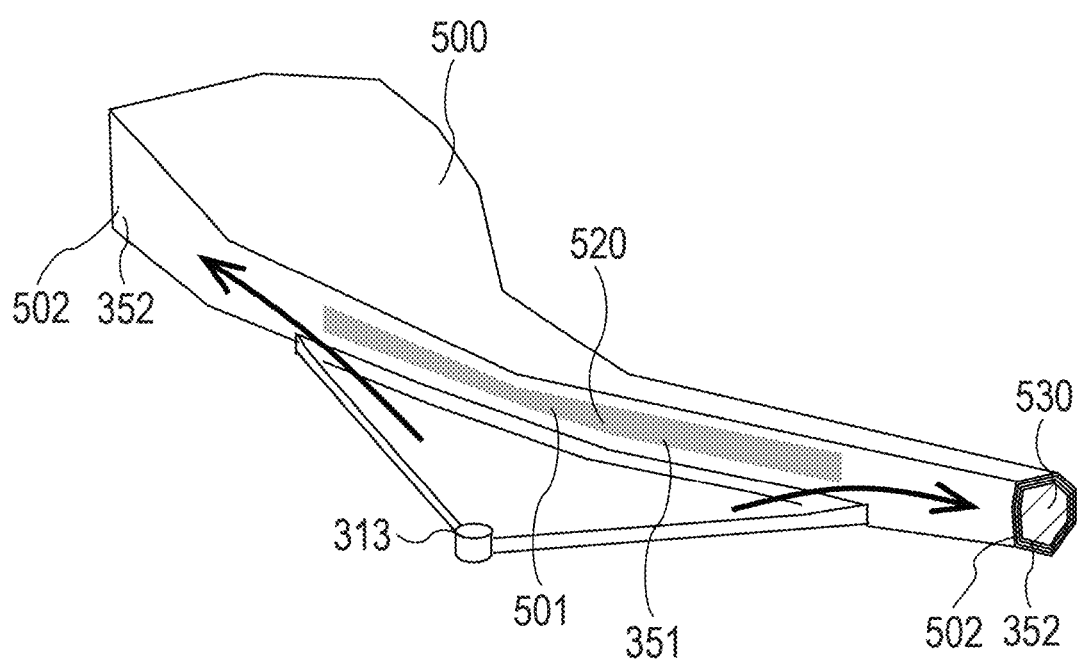
FIG. 5 is a diagram schematically illustrating a state in which the preform according to an embodiment of the invention is placed in the mold, and resin is injected.
Figure 6A:
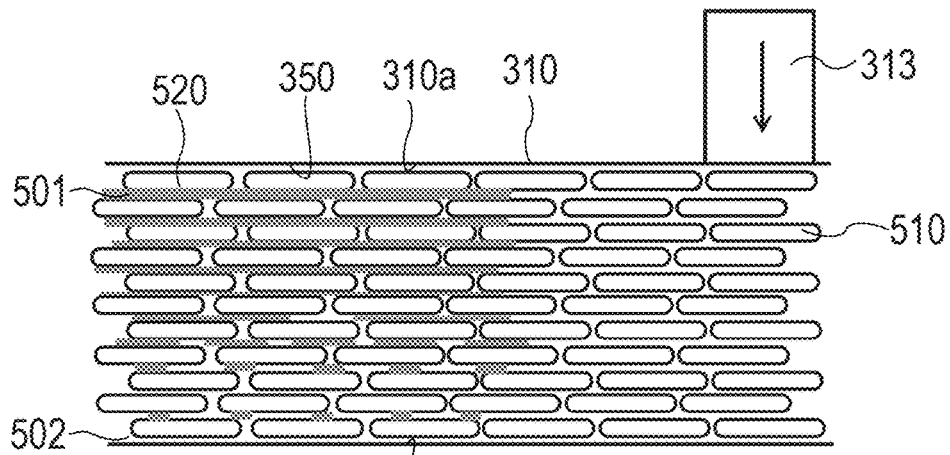
Figure 6B:
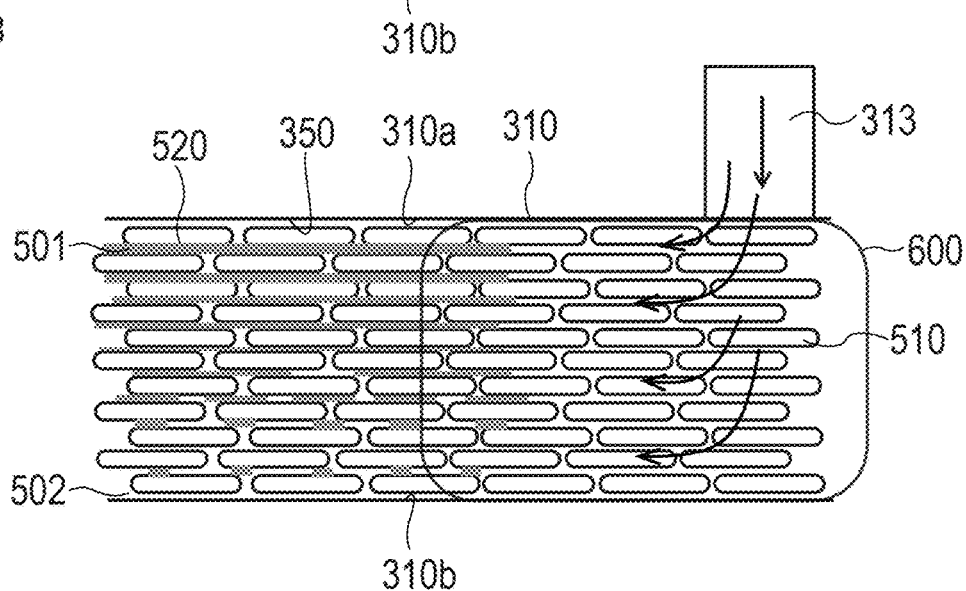
Figure 7A:
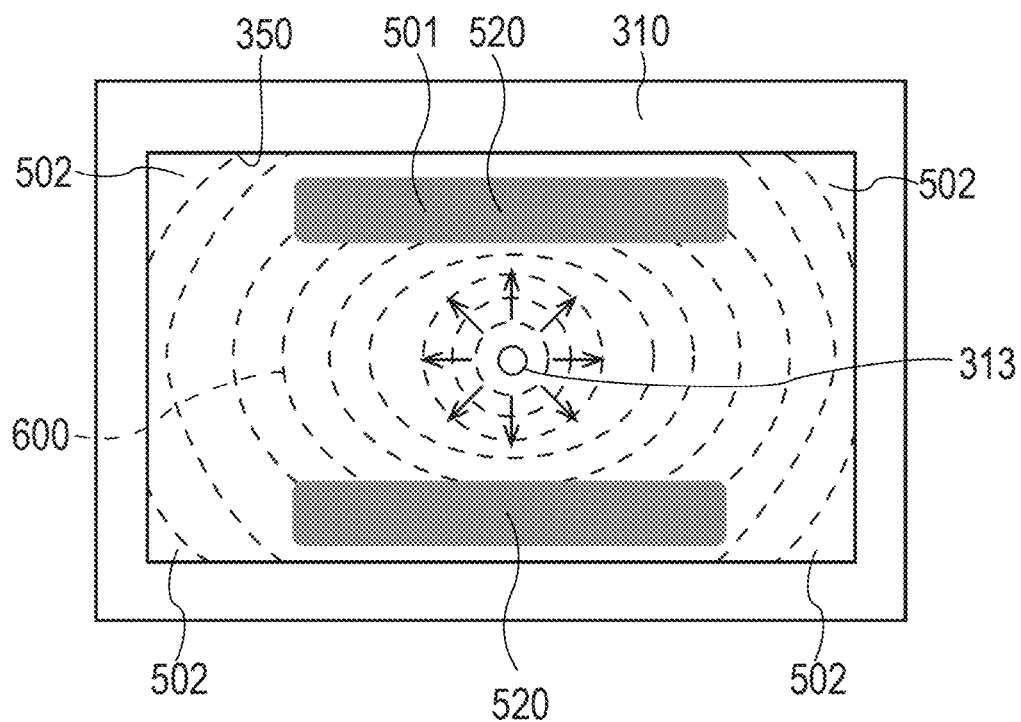
Figure 8A:
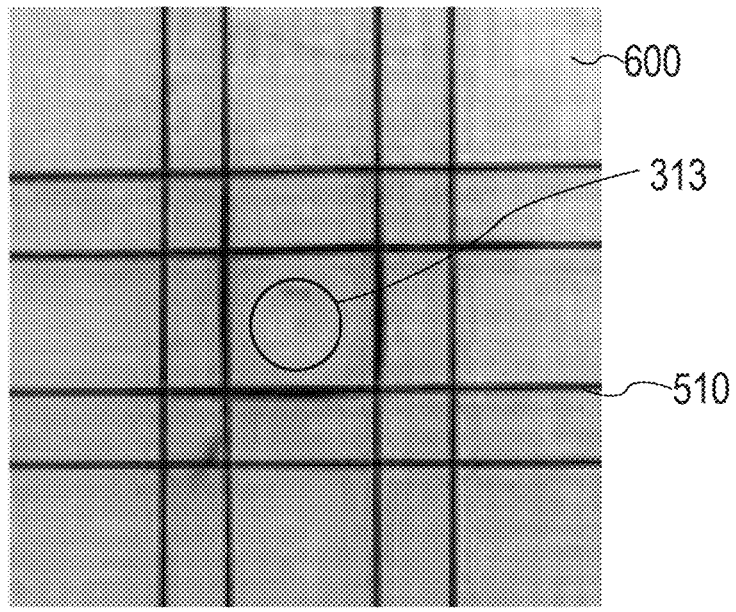
Figure 8B:
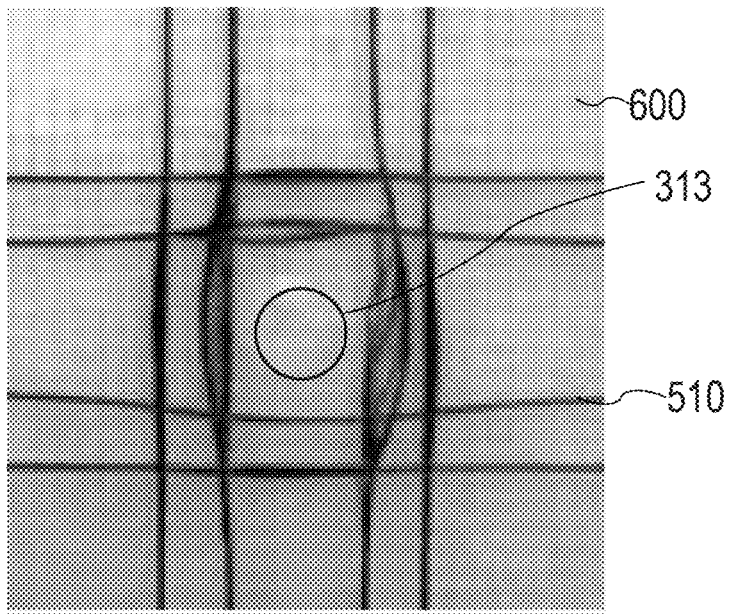
Figure 9:
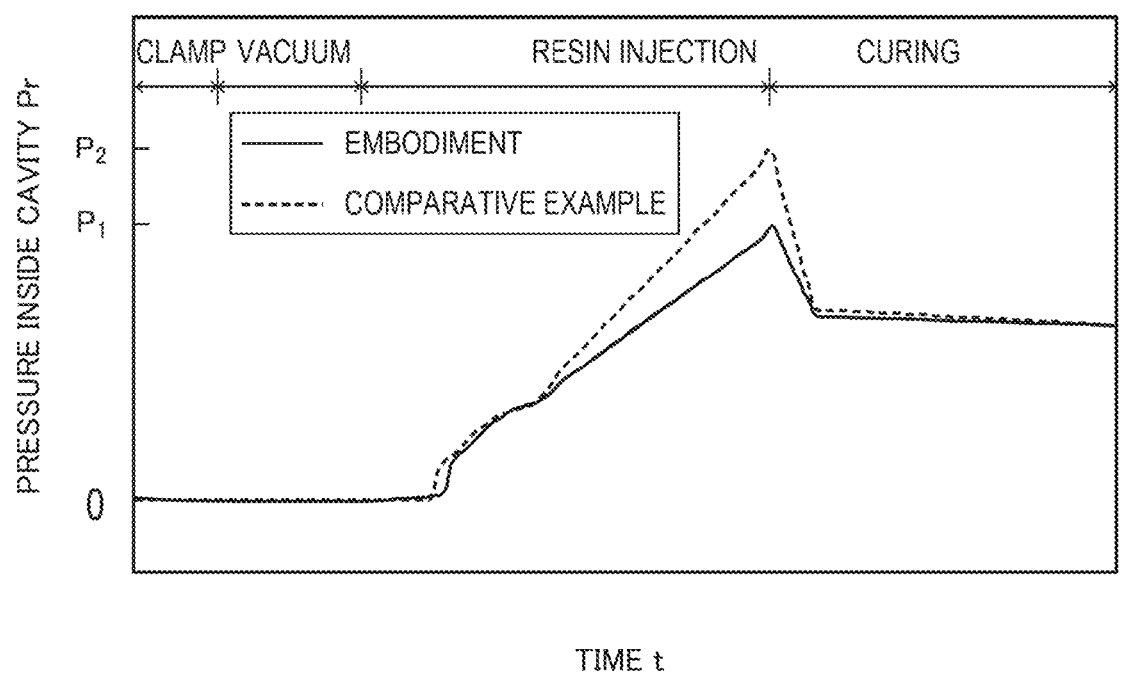
FIG. 9 is a diagram illustrating a change of the pressure of the cavity depending on time when the manufacturing method for the composite material according to the embodiment is carried out.
Figure 10:
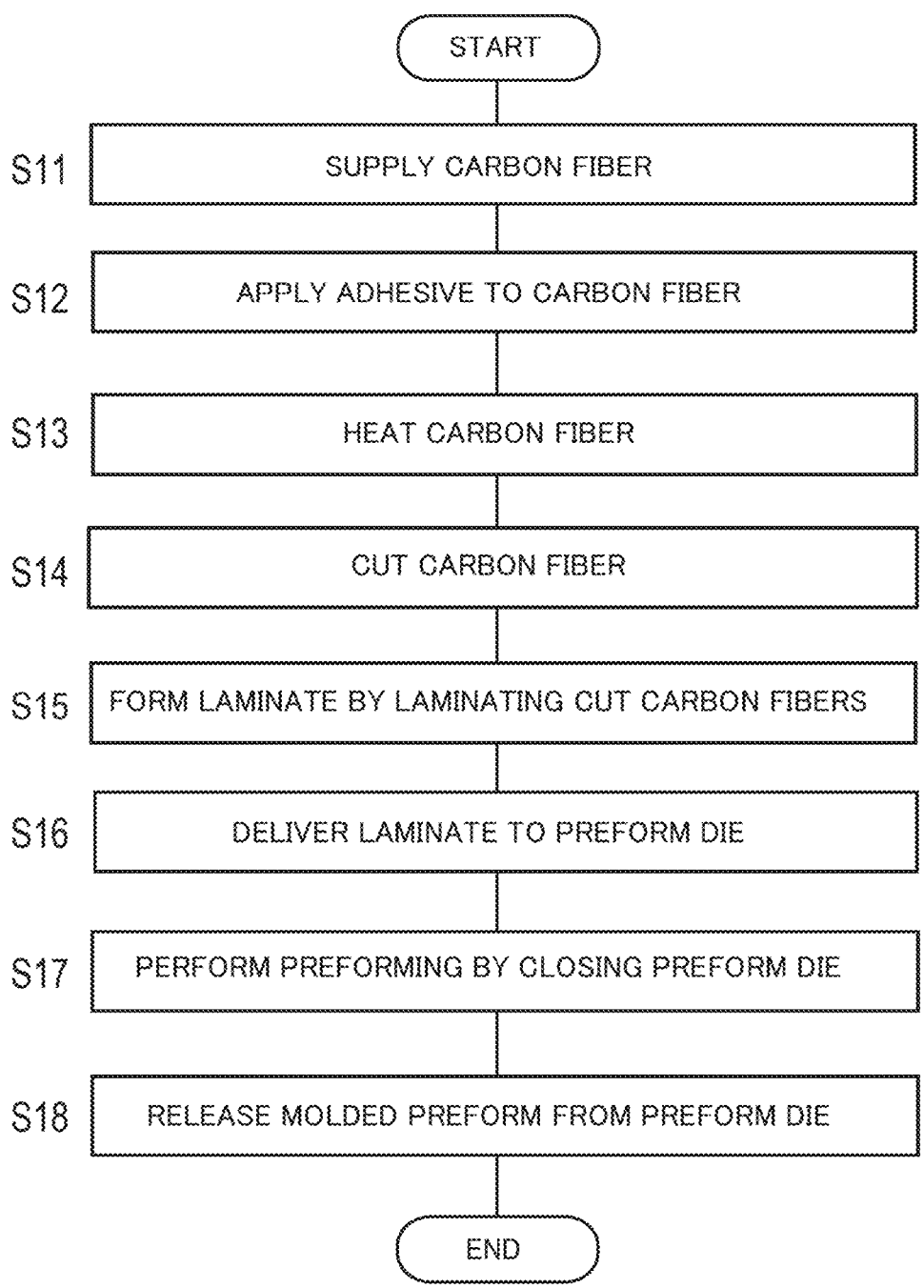
FIG. 10 is a flowchart illustrating a method of forming the preform according to an embodiment of the invention.
Figure 11:
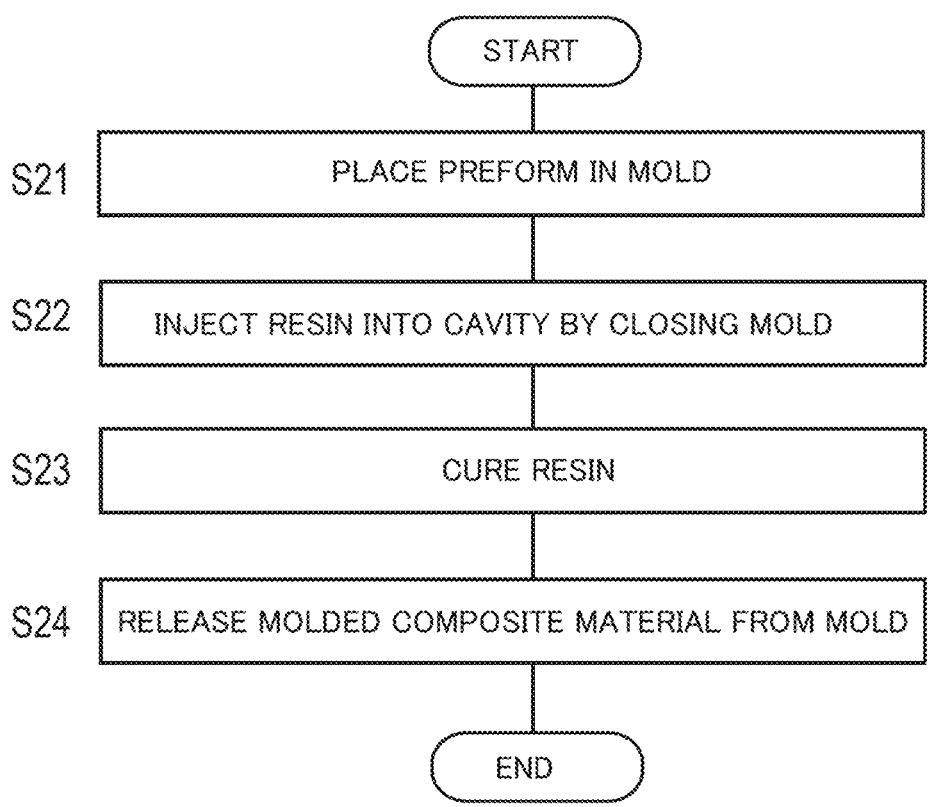
FIG. 11 is a flowchart illustrating a method of molding a composite material according to an embodiment of the invention.
Figure 12A:
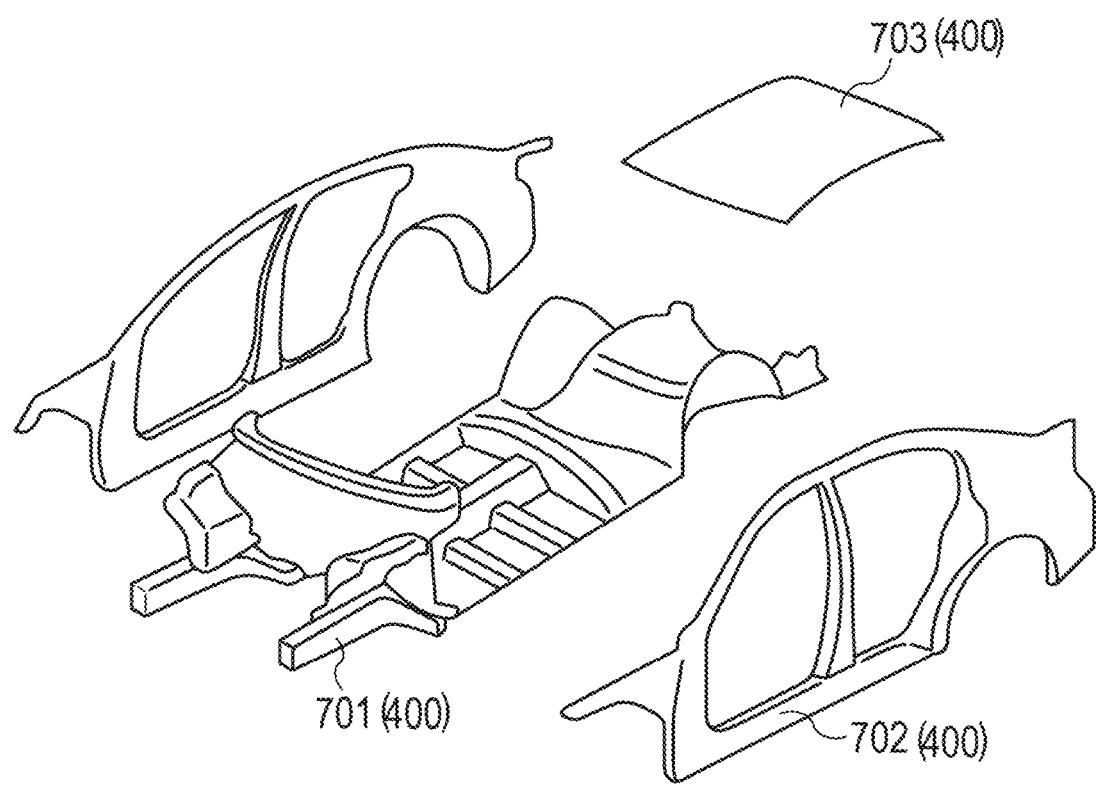
Figure 12B:
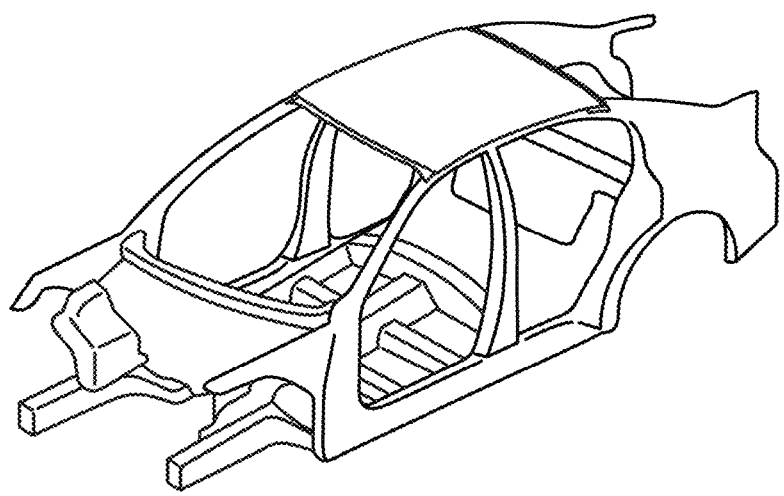

FIG. 1 is a diagram for describing a manufacturing apparatus 100 for a composite material 400 and a whole flow of a manufacturing method according to an embodiment of the invention. FIGS. 2A-2B and 3A-3B are diagrams for describing a preforming apparatus 200 for forming a preform 500 (corresponding to a preform for a composite material) according to an embodiment of the invention. FIG. 4 is a schematic diagram illustrating a molding apparatus 300 for molding a composite material 400 using the preform 500 according to an embodiment of the invention. FIG. 5 is a diagram schematically illustrating a state in which the preform 500 according to an embodiment of the invention is placed in a mold 310, and resin 600 is injected. FIGS. 6A-6C and 7A-7B are conceptual diagrams for describing a principle of the invention. FIGS. 8A-8B are photographs illustrating an evaluation result for a misalignment orientation state in a reinforcement 510 caused by flowing of resin 600. FIG. 9 is a diagram illustrating a change of the pressure of a cavity 350 depending on time when a manufacturing method for the composite material 400 according to the embodiment is carried out. FIG. 10 is a flowchart illustrating a method of forming the preform 500 according to an embodiment of the invention. FIG. 11 is a flowchart illustrating a method of molding a composite material 400 according to an embodiment of the invention. FIGS. 12A-12B are perspective views illustrating automobile components 701 to 703 and a car body 700 obtained by using the composite material 400 according to an embodiment of the invention. Note that the arrows in FIGS. 2A-2B and 3A indicate a conveying direction (directed to a downstream process) of the reinforcement 510 using a conveying unit 210. In addition, the arrows in FIG. 3B indicate a forming direction when the reinforcement 510 is preformed. Furthermore, the arrows in FIGS. 5 and 6A-6C indicate a flowing direction of the resin 600.

Embodiments of the present invention will now be described with reference to each drawing.

(Preform)

The preform 500 according to this embodiment is formed by infusing an adhesive 520 into the reinforcement 510.

The reinforcement 510 may be formed of, for example, carbon fiber, glass fiber, organic fiber, or the like. According to this embodiment, an example of using carbon fiber as the reinforcement 510 will be described. The carbon fiber 510 has a small thermal expansion coefficient and excellent dimensional stability, so that its mechanical property is not easily degraded even under a high temperature. Therefore, the carbon fiber 510 can be preferably employed as the reinforcement 510 of the composite material 400 for the automobile car body 700 or the like. The carbon fiber 510 may be used to form a sheet-shaped reinforcement 510 such as a unidirectional (UD) material obtained by unidirectionally weaving fibers or a non-crimped fabric (NCF) integrated using subsidiary fibers by multidirectionally laminating a plurality of sheets obtained by unidirectionally weaving fibers. In general, the laminated structure is, depends on a material property required for the composite material 400 which is a molded product, laminated to have a plurality of orientation angles. According to this embodiment, it is assumed that three types of fabrics are laminated, including an NCF material having a fiber orientation of ±45°, a UD material having a fiber orientation of 90°, and a UD material having a fiber orientation of 0°.

The adhesive 520 is applied to the carbon fibers 510 to bond the carbon fibers 510 with each other. As a result, it is possible to stably maintain the carbon fibers 510 in a sheet-shaped shape and suppress a deviation of arrangement in the carbon fiber 510. In addition, when the laminate 510b of the carbon fiber 510 is preformed in a desired shape (refer to FIG. 3B), the adhesive 520 holds the shape. As illustrated in FIGS. 6A and 7A, the adhesive 520 is applied to the carbon fiber 510 such that a first region 501 containing the adhesive 520 with a high density and a second region 502 containing the adhesive 520 with a low density relative to the first region 501 are formed. Since a density of the adhesive 520 contained in the first region 501 is higher than that of the second region 502, flowing of the resin 600 flowing between the carbon fibers 510 is suppressed by the adhesive 520. For this reason, the second region 502 has a flowing resistance of the resin 600 lower than that of the first region 501. In this manner, the flowing resistance of the resin 600 can be controlled by adjusting a content density distribution by controlling the portion for applying the adhesive 520.

A material of the adhesive 520 is not particularly limited as long as it can be softened by heat, and any one known in the art may be employed. For example, thermoplastic resin such as polyolefin resin, styrene-based resin, nylon resins, or polyurethane resin, thermosetting resin such as low-molecular-weight epoxy resin, and the like may be employed. According to this embodiment, epoxy resin such as the resin used in the composite material 400 described below is employed because it is low-molecular-weight epoxy resin having a high flowability due to a low melting viscosity, an excellent heat resistance, and an excellent humidity resistance. Any type of the low-molecular-weight epoxy resin may be employed without a particular limitation as long as it has a low viscosity such that it can be infused into the carbon fiber 510 before curing. For example, the low molecular-weight epoxy resin known in the art may be employed.

(Composite Material)

A composite material 400 according to this embodiment is manufactured by infusing resin 600 into a preform 500 obtained by preforming the carbon fiber 510 in a predetermined shape in advance and curing the resin.

The composite material 400 has a strength and stiffness higher than those of a molded product solely formed of the resin 600 because the composite material 400 is formed by combining the carbon fiber 510 and the resin 600. In addition, if the composite material 400 is applied to a structural component such as a front side member 701 or a pillar 702, or an exterior component such as a roof 703 employed in an automobile car body 700 (refer to FIG. 12B) illustrated in FIG. 12A, it is possible to manufacture the car body 700 in a light weight, compared to the car body formed by assembling steel components.

The composite material 400 according to this embodiment is formed by infusing resin 600 into the 500. According to this embodiment, in order to improve stiffness, the core material 530 of FIG. 3B is inserted into the inside of the composite material 400.

Thermosetting resin such as epoxy resin or phenol resin is employed as the resin 600. According to this embodiment, epoxy resin is employed because it has an excellent mechanical property and excellent dimensional stability. Two-part epoxy resin predominantly employed and is used by mixing a main agent and a curing agent. A bisphenol A-type epoxy resin is employed as the main agent, and an amine-based epoxy resin is employed as the curing agent. However, without limiting to such resins, the type of the resin may be appropriately selected depending on a desired material property. In addition, the resin 600 contains an internal release agent such that the composite material 400 can be easily released after the molding. Any type of the internal release agent known in the art may be employed without a particular limitation.

The core material 530 is formed inside the composite material 400 by infusing the resin 600 into the carbon fiber 510 while it is covered by the carbon fiber 510. As the material of the core material 530, a foam body (foam core) is preferably employed from the viewpoint of the light weight, but not limited thereto. For example, a foam body formed of polyurethane resin, vinyl chloride resin, polyolefin, acrylic resin, polyimide resin (for example polymethacrylimide (PMI), or polyetherimide (PEI)) is appropriately employed.

(Manufacturing Apparatus)

A manufacturing apparatus 100 for the composite material 400 will be described with reference to FIGS. 1 to 4. The manufacturing apparatus 100 for the composite 400 according to this embodiment can be classified into a preforming apparatus 200 for forming the preform 500 illustrated in the upper and middle parts of FIG. 1, and a molding apparatus 300 for molding the composite material 400 using the preform 500 illustrated in the lower part of FIG. 1. In addition, the manufacturing apparatus 100 of the composite material 400 has a control unit 110 for controlling operation of the entire manufacturing apparatus 100.

First, the preforming apparatus 200 for forming the preform 500 will be described.

In general, as illustrated in the upper part of FIG. 1, the preforming apparatus 200 includes a conveying unit 210 configured to continuously conveys the carbon fiber 510, an applying unit 220 configured to apply the adhesive 520 to the carbon fiber 510, a heater 230 configured to heat the carbon fiber 510 applied with the adhesive 520, a cutting unit 240 configured to cut the carbon fiber 510, and a preform die 260 configured to preform the carbon fiber 510.

As illustrated in the upper part of FIG. 1, the conveying unit 210 continuously conveys the carbon fiber 510 supplied from a base roll 510a, around which the carbon fiber 510 is wound, to an applying unit 220, a heater 230, and a cutting unit 240 included in a downstream process. The conveying unit 210 is a belt conveyor. The applying unit 220, the heater 230, and the cutting unit 240 are placed along the conveyance path of the belt conveyor to allow a continuous work.

Figure 2A:
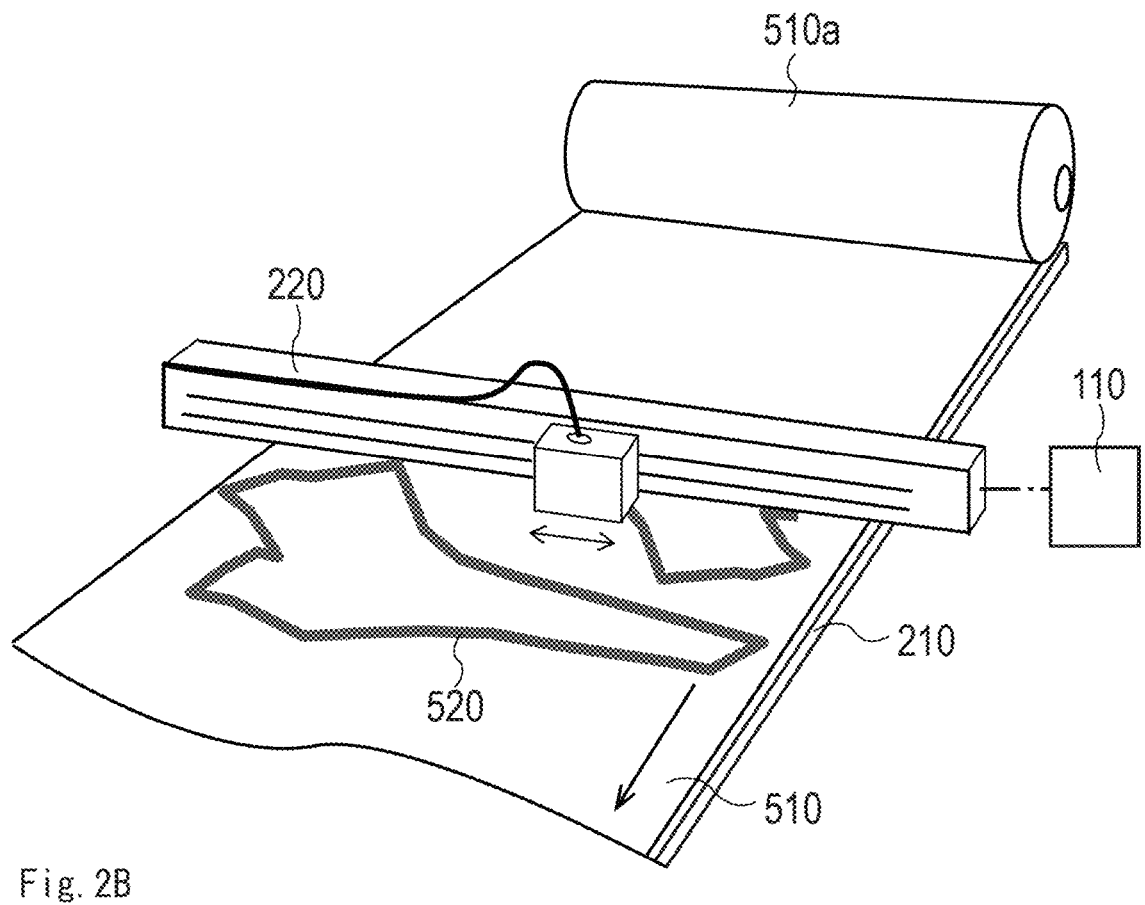

As illustrated in FIG. 2A, the applying unit 220 is configured to move in a planar direction of the conveying unit 210 to apply an adhesive 520 to the carbon fiber 510 conveyed from the upstream of the conveying unit 210. The application amount of the adhesive 520 depends on a type and physical properties of the adhesive 520, and may be set to, for example, 10 to 100 g/m$^3$. The applying unit 220 may be configured, for example, on the basis of a screen printing method using a powdered (solid) adhesive 520, an in jet method using a liquid adhesive 520, a laminating method in which the adhesive 520 processed into a nonwoven fabric, which is laminated on the carbon fiber 510, and the like. According to this embodiment, the inkjet method is employed because it provides high mass productivity and high accuracy. In the inkjet method, the adhesive 520 is made into fine droplets and is sprayed directly to the carbon fiber 510, and the application amount of the adhesive 520 can be adjusted depending on a portion to be applied.

As illustrated in FIG. 23, the heater 230 heats the carbon fiber 510 to which the adhesive 520 is applied by the applying unit 220. A heating temperature depends on the melting temperature of the adhesive 520 to be used, for example, it may be set to 70 to 150° C. As a result, the adhesive 520 can be softened or melted and infused into the carbon fiber 510. As a result of infusion of the adhesive 520, the content of the adhesive 520 per unit area of the carbon fiber 510, that is, the content density is determined. The content density of the adhesive 520 depends on a shape of the composite material 400 or a thickness of the laminate 510b of the carbon fiber 510. For example, the content density may be set to 80 g/m$^3$ in a high density portion and 10 g/m$^3$ in a low density portion.

Although not particularly limited, it is desirable that the heater 230 is configured to instantaneously and evenly heating the carbon fiber 50. For example, the heater 230 may be a continuous furnace, a high frequency coil, a far infrared heater, a hot wind blower, and the like.

Figure 3A:
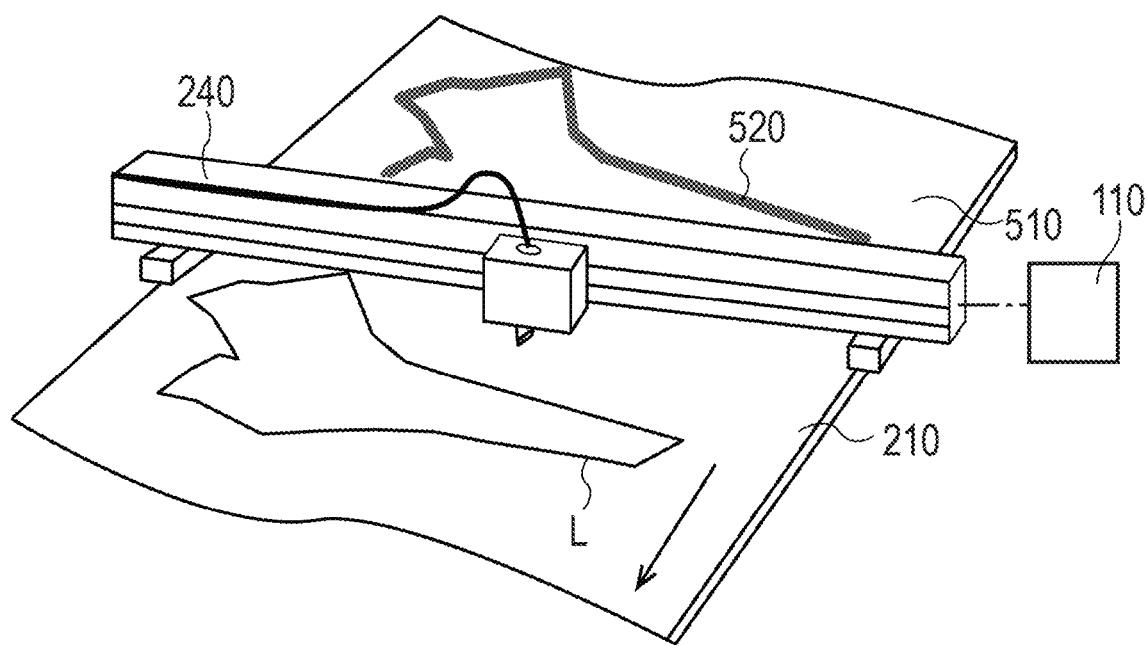
Figure 3B:
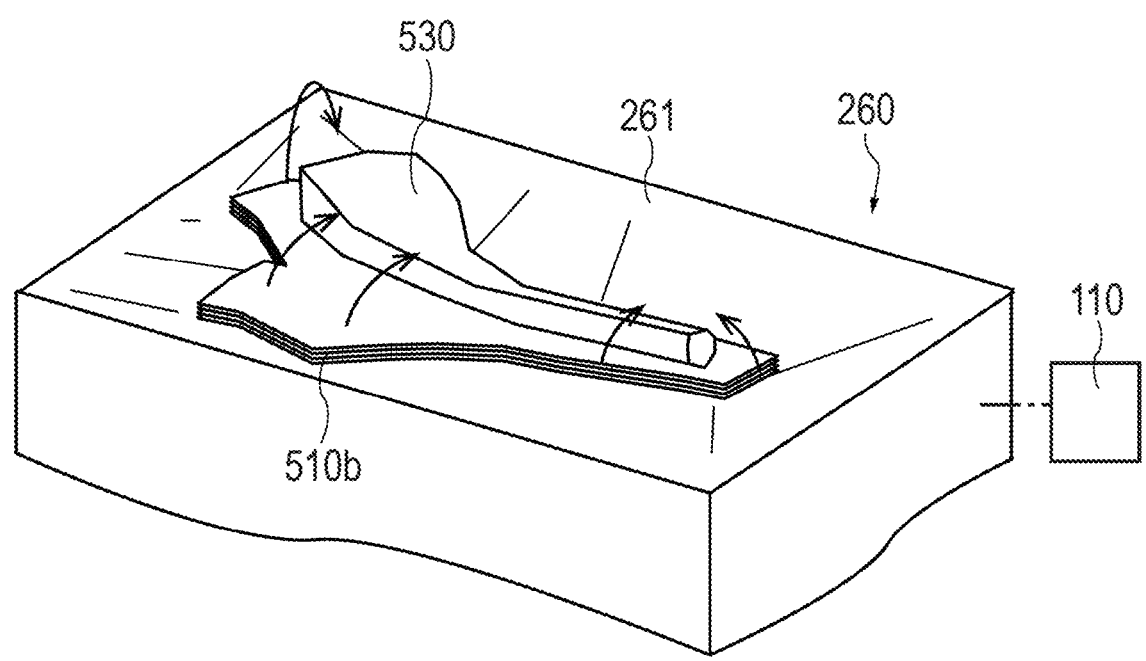

As illustrated in FIG. 3A, the cutting unit 240 cuts the carbon fiber 510 infused with the adhesive 520 along a predetermined cutting line L. The cutting unit 210 may include various cutting mechanisms such as an ultrasonic cutter, a laser cutter, a circular saw cutter, a press cutter, and a scissors cutter. According to this embodiment, an ultrasonic cutter is employed because it can accurately cut the carbon fiber 510 within a relatively short time.

The preform die 260 is used to preform the carbon fiber 510 in a predetermined three-dimensional shape. As illustrated in the middle part of FIG. 1, the preform die 260 has a lower die 261 in which the carbon fiber 510 as a target of the preform 500 is placed, and an upper die 262 that is movable to and from the lower die 261. A forming surface matching the shape of the preform 500 of the carbon fiber 510 is formed on a surface of the upper die 262 facing the lower die 261. By applying a pressing force to the carbon fiber 510 by moving the upper die 262 toward the lower die 261 while the carbon fiber 510 is placed on the lower die 261, the carbon fiber 510 can be formed into the preform 500.

Next, a molding apparatus 300 for molding the composite material 400 using the preform 500 will be described.

Referring to FIG. 4, the molding apparatus 300 according to this embodiment generally includes an openable/closable mold 310 for forming a cavity 350 in which the preform 500 is placed, a press unit 320 that applies a clamping pressure to the mold 310, a resin injection unit 330 that injects melted resin 600 into the cavity 350, and a mold temperature adjustment unit 340 that adjusts a temperature of the mold 310.

The mold 310 has an openable/closable pair of an upper (male) die 311 and a lower (female) die 312. The upper die 311 and the lower die 312 form the cavity 350 hermetically sealed therebetween. The preform 500 is placed in the cavity 350.

The mold 310 further has an injection port 313 for injecting resin 600 into the cavity 350. The injection port 313 communicates with the cavity 350 and the resin injection unit 330. As illustrated in FIG. 6A, surfaces of the mold 310 facing the cavity 350 has a first wall surface 310a of the injection port 313 side, and a second wall surface 310b of the side opposite to the injection port 313. The second wall surface 310b is a surface placed in the farthest location from the injection port 313 out of the surfaces of the mold 310 facing the cavity 350.

According to this embodiment, as illustrated in FIG. 4, the injection port 313 is placed in a side portion of the preform 500 placed in the cavity 350. Therefore, the surface placed in the side portion (left side in FIG. 4) is the first wall surface 310a, and an end portion of the preform 500 placed oppositely to this side portion (right side in FIG. 4) is the second wall surface 310b. Note that the injection port 313 may be provided in an upper part of the mold 310. In this case, the resin 600 is infused from the upper part to the lower part of the preform 500. In addition, a suction hole for suctioning the air by vacuum evacuation inside the cavity 350 may be provided in the lower die 312. Furthermore, in order to hermetically seal the cavity 350, a seal member or the like may be provided on mating faces between the upper and lower dies 311 and 312.

The press unit 320 may be a press machine that has a cylinder 321 actuated by a fluid pressure such as a hydraulic pressure to adjust the clamping pressure by controlling the hydraulic pressure.

The resin injection unit 330 may be provided with a known circulation type pump mechanism capable of supplying, to the mold 310, a main agent supplied from a main agent tank 331 and a curing agent supplied from a curing agent tank 332 while circulating them. The resin injection unit 330 communicates with the injection port 313 to inject the resin 600 into the cavity 350.

A mold temperature adjustment unit 340 adjusts a temperature of the mold 310 such that the temperature of the cavity 350 becomes equal to or lower than a melting temperature of the adhesive 520 in an initial stage of injection of the resin 600. After placing the preform 500 in the cavity 350, the resin 600 injected into the cavity 350 is cured by slowly heating the resin 600 to a curing temperature. The mold temperature adjustment unit 340 is a heating apparatus and may include, for example, an electric heater for directly heating the mold 310, a temperature adjustment mechanism for adjusting the temperature by circulating a heating medium such as oil.

The control unit 110 controls the operation of the entire manufacturing apparatus 100. Specifically, referring to FIG. 4, the control unit 110 includes a memory unit 111, a computation unit 112 and an input/output unit 113 that transmits and receives various data or control commands. The input/output unit 113 is electrically connected to the applying unit 220, the heater 230, the cutting unit 240, the preform die 260, the press unit 320, the resin injection unit 330, and the mold temperature adjustment unit 340.

The memory unit 111 includes a ROM or RAM to store data such as an application amount of the adhesive 520, distributions of the first and second regions 501 and 502, and shapes of the preform 500 and the composite material 400 to be molded. The computation unit 112 has a central processing unit (CPU) as a main component and receives data such as a conveyance speed of the carbon fiber 510 in the conveying unit 210 via an input/output unit 113. The computation unit 112 computes an application timing or amount of the adhesive 520, a heating temperature of the mold 310 in the mold temperature adjustment unit 340, and the like on the basis of the data read from the memory unit 111 and the data received from the input/output unit 113. The control signal based on the computed data is transmitted to the applying unit 220, the heater 230, the cutting unit 240, the preform die 260, the press unit 320, the resin injection unit 330, and the mold temperature adjustment unit 340 via the input/output unit 113. In this manner, the control unit 110 controls the application amount and location of the adhesive 520, operation of the preform die 260, the clamping pressure of the mold 310, the injection amount of the resin 600, the temperature of the mold 310, and the like.

(Manufacturing Method)

A manufacturing method for the composite material 400 according to an embodiment will be described.

The manufacturing method for the composite material 400 generally includes two processes, that is, a process of molding the preform 500 of FIG. 10 and a process of molding the composite material 400 using the preform 500 of FIG. 11.

First, the process of forming the preform 500 will be described.

As illustrated in FIG. 10, the process of forming the preform 500 includes a supplying process for supplying a material of the carbon fiber 510 (step S11), an applying process for applying the adhesive 520 to the sheet-shaped carbon fiber 510 having the first and second regions 501 and 502 such that a content density of the adhesive 520 in the second region 502 is lower than that of the first region 501 (step S12), a heating process for heating the carbon fiber 510 (step S13), a cutting process for cutting the carbon fiber 510 (step S14), a laminating process for forming the laminate 510b (step S15), a conveying process for conveying the laminate 510b (step S16), a preforming process for forming the preform 500 by preforming the carbon fiber 510 (step S17), and a process of releasing the formed preform 500 from the preform die 260 (step S18).

Each process will be described.

First, in step S11, as illustrated in the upper part of FIG. 1, the carbon fiber 510 is extracted from the base roll 510a around which the carbon fiber 510 is wound, and is continuously supplied to the conveying unit 210.

Then, in step S12, as illustrated in FIG. 2A, the applying unit 220 applies the adhesive 520 to the carbon fiber 510 continuously delivered from the conveying unit 210. In this case, the application amount is adjusted depending on a predetermined content density distribution. That is, the adhesive 520 is applied such that the second region 502 of the carbon fiber 510 has a content density of the adhesive 520 lower than that of the first region 501 of the carbon fiber 510.

Figure 2B:
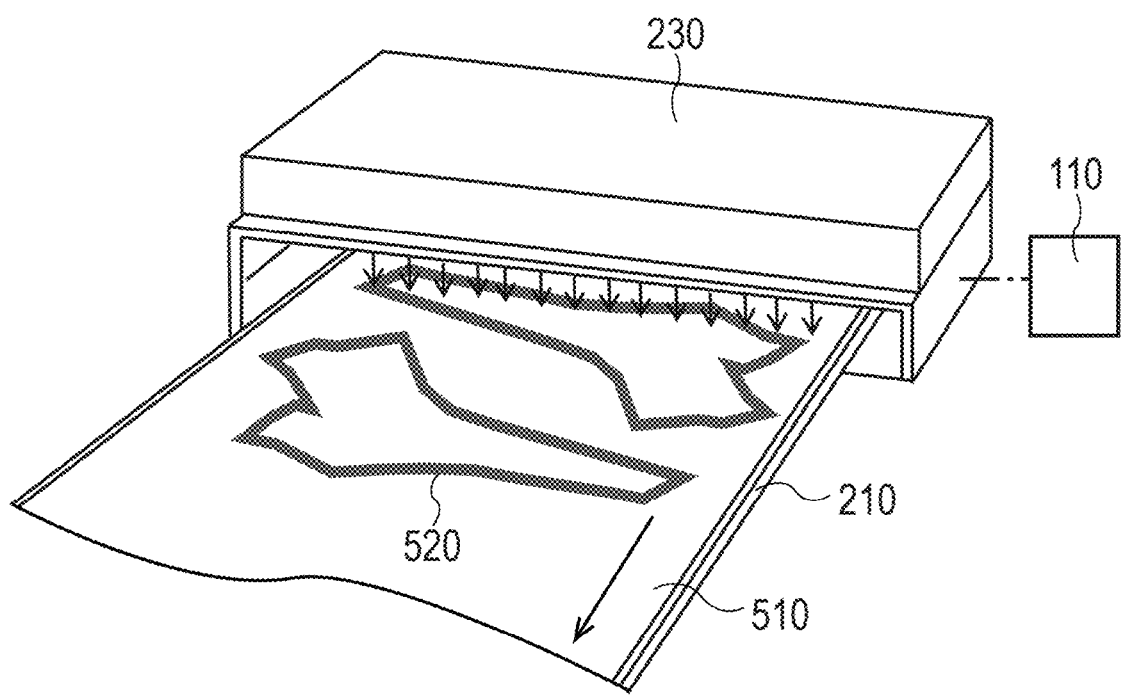

Then, in step S13, as illustrated in FIG. 2B, the applied adhesive 520 is softened or melted by heating the carbon fiber 510 using the heater 230, and the adhesive 520 is infused between layers of the carbon fiber 510. By infusing the adhesive 520, a content density distribution of the adhesive 520 is provided in the carbon fiber 510.

Then, in step S14, as illustrated in FIG. 3A, the carbon fiber 510 is cut along the cutting line L while the adhesive 520 is melted. An exploded shape of the composite material 400 as a molded product is set in advance, and the cutting line L is determined depending on the exploded shape.

Then, in step S15, as illustrated in the laminating process of the middle part of FIG. 1, a predetermined number of sheets of the cut carbon fibers 510 are laminated using a carriage robot 250. According to this embodiment, the carbon fibers 510 are laminated in different lamination orientations in a predetermined lamination structure. Specifically, three types of materials are employed, including an NCF material having a fiber orientation of ±45°, a UD material having a fiber orientation of 90°, and a UD material having a fiber orientation of 0°. For this reason, the supplying process, the applying process, the heating process, and the cutting process are carried out in lanes of production lines different from each other, so that the carbon fibers 510 cut at respective orientation angles are laminated in a predetermined alignment to form the laminate 510b.

Then, in step S16, as illustrated in FIG. 3B, the laminate 510b is conveyed to and placed on the lower die 261 of the preform die 260. In this case, since the layers of the carbon fibers 510 are bonded using the adhesive 520, it is possible to suppress a deviation of the carbon fiber 510 during the conveyance. A temperature during the conveyance is preferably managed such that the temperature of the carbon fiber 510 decreases to, for example, 50 to 70° C. If the temperature is managed in this manner, the adhesive 520 can have a half-curing state or a curing state when the carbon fiber 510 is conveyed to the preform die 260. As a result, the adhesive 520 can be cured within a short time during the preforming. Therefore, it is possible to shorten the time for the preforming.

Then, in step S17, as indicated by the arrow of FIG. 3B, the laminate 510b of the carbon fiber 510 placed in the lower die 261 of the preform die 260 is preformed to preform the preform 500. In this case, a core material 530 is disposed such that it is covered by the carbon fiber 510. The upper die 262 may have a plurality of divided dies as illustrated in the preforming process in the middle part of FIG. 1, or may have a single die. The preform die 260 is preferably cooled, for example, to a temperature of 20 to 40° C. As a result, cooling of the adhesive 520 starts as soon as the mold is closed, so that the adhesive 520 is hardened, and the preforming is completed.

Then, in step S18, the preform die 260 is opened, and the preform 500 is released, so that the preforming of the preform 500 is completed.

Next, a process of molding the composite material 400 using the preform 500 will be described.

As illustrated in FIG. 11, the process of molding the composite material 400 includes a process of placing the preform 500 in the cavity 350 of the mold 310 (step S21), a process of injecting the resin 600 into the cavity 350 (step S22), a process of curing the resin 600 (step S23), and a process of releasing the molded composite material 400 from the mold 310 (step S24).

Each process will be described.

First, in step S21, the preform 500 is placed in the cavity 350 of the mold 310 (refer to FIG. 4). In this case, the first region 501 of the carbon fiber 510 is placed in a portion 351 of the cavity 350 where the resin 600 easily flows, and the second region 502 of the carbon fiber 510 is placed in a portion 352 of the cavity 350 where the resin 600 does not easily flow. The temperature of the mold 310 is adjusted by the mold temperature adjustment unit 310 such that the temperature the cavity 350 is equal to or lower than the melting temperature of the adhesive 520. Note that the portion 351 where the resin 600 easily flows and the portion 352 where the resin 600 does not easily flow are obtained in advance through simulation based on a shape of the composite material 400 or the like.

Figure 6C:
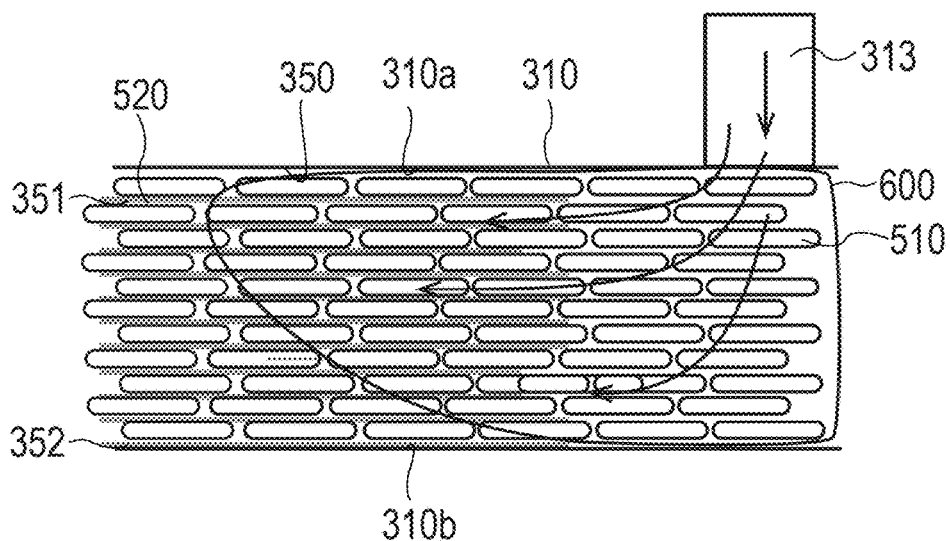

As illustrated in FIG. 6C, flowability of the resin 600 changes in a laminating direction of the laminate 510b of the carbon fiber 510 as the preform 500 including the laminate 510b of the carbon fiber 510 placed in the cavity 350 is seen in a side direction. Specifically, a portion of the mold 310 close to the first wall surface 310a in the injection port 313 side is the portion 351 where the resin 600 easily flows, and a portion close to the second wall surface 310b in the side opposite to the injection port 313 is the portion 352 where the resin 600 does not easily flow. That is, the flowability of the resin 600 decreases from the first wall surface 310a close to the injection port 313 toward the second wall surface 310b far from the injection port 313. Therefore, as illustrated in FIG. 6A, the first and second regions 501 and 502 of the carbon fiber 510 are placed in the cavity 350 such that the content density of the adhesive 520 decreases from the first wall surface 310a of the injection port 313 side toward the second wall surface 310b in the side opposite to the injection port 313.

Figure 7B:
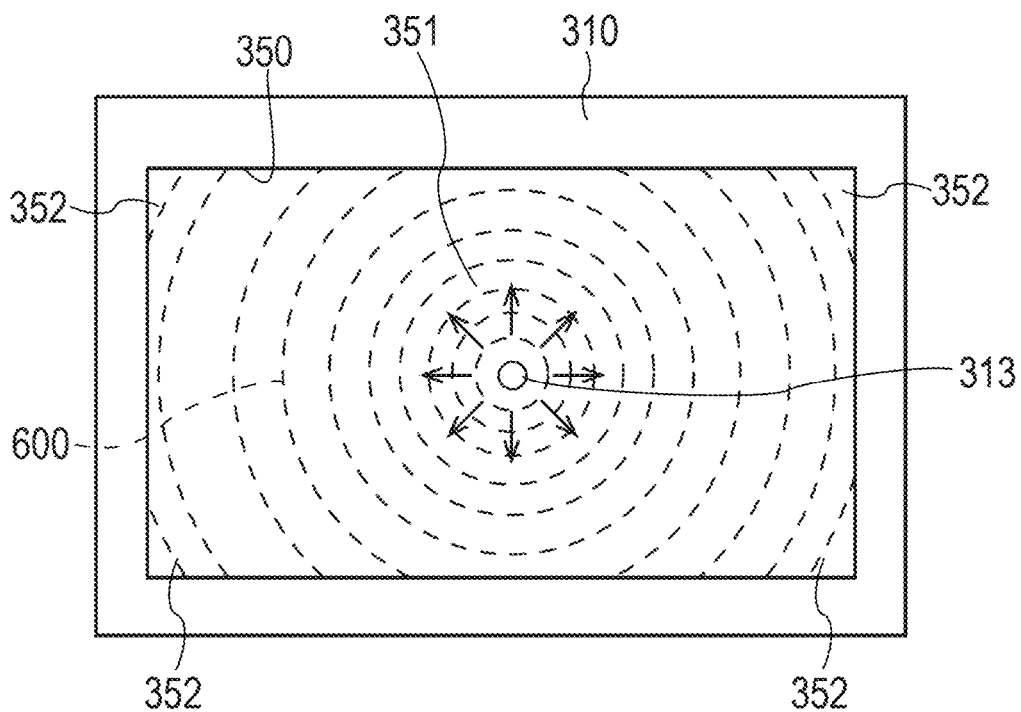

As illustrated in FIG. 7B, the resin 600 flows to spread from the injection port 313 in a concentric manner as the laminate 510b of the carbon fiber 510 is seen from the top. Therefore, the vicinity of the injection port 313 corresponds to the portion 351 where the resin 600 easily flows, and a peripheral edge of the preform 500 far from the injection port 313 corresponds to the portion 352 where the resin 600 does not easily flow.

According to this embodiment, as illustrated in FIG. 5, the resin 600 is infused in a fan shape from lateral side of the preform 500 toward the ends. That is, the portion 351 where the resin 600 easily flows is the lateral side of the preform 500 close to the injection port 313, and the portion 352 where the resin 600 does not easily flow is the end portions of the preform 500. Therefore, the first and second regions 501 and 502 of the carbon fiber 510 are placed in the cavity 350 such that the content density of the adhesive 520 is high in the lateral side of the preform 500, and decreases toward the end portions.

Then, in step S22, the resin 600 is injected to the cavity 350.

As illustrated in FIG. 6C, flowability of the resin 600 decreases from the first wall surface 310a close to the injection port 313 toward the second wall surface 310b far from the injection port 313. Therefore, when the adhesive 520 is applied uniformly between the layers of the laminate 510b, a difference is generated in a flowing velocity of the resin 600. In a portion where the difference of the flowing velocity is large, the layer of the carbon fiber 510 may be deviated or twisted in some cases. If a deviation or twist is generated in the layer of the carbon fiber 510, a resin rich portion or a portion only filled with the resin 600 may be formed between the layers. This may degrade a strength of the composite material 400 as a molded product disadvantageously.

According to this embodiment, as illustrated in FIG. 6A, the first and second regions 501 and 502 of the carbon fiber 510 are placed in the cavity 350 such that the content density of the adhesive 520 decreases from the first wall surface 310a of the injection port 313 side toward the second wall surface 310b in the side opposite to the injection port 313. By changing the content density of the adhesive 520, it is possible to adjust the flowing resistance of the resin 600 to gradually decrease from the first wall surface 310a toward the second wall surface 310b. That is, the flowing velocity of the resin 600 flowing between the layers of the carbon fibers 510 in the first wall surface 310a side which is the portion 351 where the resin 600 easily flows can be set to be slow, and the flowing velocity of the resin 600 flowing between the layers of the carbon fibers 510 toward the second wall surface 310b which is the portion 352 where the resin 600 does not easily flow can be set to be gradually fast. Therefore, as illustrated in FIG. 6B, it is possible to nearly uniformly set the flowability of the resin 600 between the layers of the carbon fibers 510. As a result, it is possible to reduce a difference of the flowing velocity of the resin 600 between the layers of the carbon fibers 510 and suppress a wrinkle or twist in the carbon fiber 510.

As illustrated in FIG. 8B, the orientation of the carbon fiber 510 may be misaligned in the outermost layer of the preform 500 placed in the vicinity of the in port 313 due to an impact force of the carbon fiber 510 caused by flowing of the resin 600 as the laminate 510b of the carbon fiber 510 is seen from the top. In particular, in an initial stage of the injection of the resin 600, the flowing velocity is generally fast. Therefore, an impact forts caused by the flowing of the resin 600 easily increases, and the orientation of the carbon fiber 510 is easily misaligned. A resin rich portion or a portion only filled with the resin 600 may be formed in a portion where the orientation of the carbon fiber 510 is misaligned in this manner. This may degrade a strength or design of the composite material 400 as a molded product.

As illustrated in FIG. 7B, the resin 600 does not easily reach a peripheral edge of the cavity 350 far from the injection port 313. Therefore, the peripheral edge of the cavity 350 corresponds to the portion 352 where the resin 600 does not easily flow. For this reason, in order to allow the resin 600 to reach the portion 352 where the resin 600 does not easily flow, it is necessary to set the maximum injection pressure $P_2$ to a high pressure in the injection work of the resin 600 as indicated by the dotted line of FIG. 9. If the maximum injection pressure $P_2$ for filling the resin 600 is set to a high pressure, the pressure in the cavity 350 also increases accordingly. Therefore, it is necessary to employ a large-sized press machine capable of applying a higher clamping pressure in order to prevent unwanted opening of the mold 310 during the injection work.

According to this embodiment, as illustrated in FIG. 7A, the first region 501 is placed in the portion 351 where the resin 600 easily flows, for example, in the of the injection port 313, and the second region 502 is placed in the portion 352 where the resin 600 does not easily flow, for example, in the peripheral edge of the cavity 350. Since the resin 600 does not easily flow in the first region 501 placed in the portion 351 where the resin 600 easily flows, the resin 600 easily flows in other portions. As a result, the flowability can be controlled such that the resin 600 relatively easily flows in the second region 502 placed in the portion 352 where the resin 600 does not easily flow. As a result, the resin 600 can reach the entire carbon fiber within a short time without increasing the injection pressure of the resin 600. Therefore, it is possible to reduce the maximum injection pressure $P_1$ of the resin 600 as indicated by the so line of FIG. 9. Since the pressure in the cavity 350 can be suppressed to a relatively small value, it is possible to shorten the molding time and reduce equipment cost. Furthermore, it is possible to lower the flowing velocity of the resin 600 by increasing the flowing resistance of the resin 600 in the vicinity of the injection port 313. As a result, as illustrated in FIG. 8A, it is possible to suppress misalignment of the fiber orientation in the vicinity of the injection port 313 and improve a strength and design of the composite material 400 as a molded product.

As a method, of addressing the aforementioned problems, for example, a method is also conceived, in which the resin 600 is injected from a plurality of portions using a mold having a plurality of injection ports (multipoint gate) to cause the resin 600 to easily flow to the portion 352 where the resin 600 does not easily flow and reduce the maximum injection pressure of the resin 600. However, since the mold provided with a plurality of injection ports is necessary, the equipment cost may increase disadvantageously. In addition, since a plurality of injection ports are provided, an equipment cost or a production time may increase in order to perform maintenance such as cleaning of the resin 600 attached to the hole of the injection port.

According to this embodiment, even when the mold 310 having a single injection port 313 is employed, it is possible to reduce the maximum injection pressure $P_1$ of the resin 600 by causing the resin 600 to easily flow to the portion 352 where the resin 600 does not easily flow. As a result, compared to a case where a mold having a plurality of injection ports is employed, it is possible to remarkably reduce the equipment cost, the maintenance cost, and the production time.

As illustrated in FIG. 7A, by controlling the flowing velocity such that the resin 600 easily flows to the portion 352 where the resin 600 does not easily flow, it is possible to allow the resin 600 to reach the entire carbon fiber within a short time. As a result, it is possible to reduce the molding time and reduce the equipment cost by eliminating necessity of remarkably increasing the maximum injection pressure $P_1$.

As described above, in an initial stage of the injection of the resin 600, the temperature of the mold 310 is adjusted in advance such that the temperature of the cavity 350 becomes equal to or lower, than the melting temperature of the adhesive 520. As a result, it is possible to hold the adhesive 520 in a solid state. Therefore, it is possible to control the flowing of the resin 600 by further improving an effect of arresting the injected resin 600.

Then, in step S23, the resin 600 infused into the carbon fiber 510 is cured by slowly heating the mold 310 to a curing temperature of the resin 600. By slowly increasing the temperature of the mold 310, the to of the cavity 350 increases due to a reactive heat caused by the curing of the resin 600 and the heat of the mold 310, so that the adhesive 520 is softened from a solid state to a half-solid or liquid state. Accordingly, the effect of arresting the resin 600 using the adhesive 520 gradually decreases. As a result, the resin 600 is infused into the carbon fiber 510 of the portion where the adhesive 520 is softened during the molding of the composite material 400. Therefore, it is possible to mold a high quality composite material 400 in which the resin 600 is nearly uniformly infused into the entire carbon fiber 510.

According to this embodiment, the resin 600 is formed of epoxy resin, and the adhesive 520 is formed of low-molecular-weight epoxy resin. As a result, the resin 600 and the adhesive 520 are formed of the similar material for the molding of the composite material 400. Therefore, it is possible to mold a more homogeneous composite material 400 by integrating the resin 600 and the adhesive 520 while suppressing formation of an interface therebetween. As a result, in an initial stage of the injection of the resin 600, the adhesive 520 has an effect off arresting the resin 600. Therefore, it is possible to control flowing of the resin 600. As the injection of the resin 600 progresses, the adhesive 520 is softened, and the resin 600 slowly spreads to the entire cavity 350. Therefore, it is possible to more homogeneously mix the resin 600 and the adhesive 520.

Then, in step 324, after the resin 600 is cured, the mold 310 is opened, and the composite material 400 obtained by integrating the carbon fiber 510, the resin 600, and the core material 530 is released, so that the molding is completed.

As described above, in the manufacturing method and the manufacturing apparatus 100 for the composite material 400 according to this embodiment, the adhesive 520 is applied to the sheet-shaped carbon fiber 510 provided with the first region 501 and the second region 502 such that the content density of the adhesive 520 of the second region 502 is lower than that of the first region 501. Then, the preform 500 is formed by preforming the carbon fiber 50, the preform 500 is placed in the cavity 350 of the mold 310, and the resin 600 is infused into the preform 500, so that the composite material 400 is molded. The resin 600 injected into the cavity 350 easily flows to a portion of the cavity 350 where the second region 502 of the carbon fiber 510 is placed, compared to a portion where the first region 501 of the carbon fiber 510 is placed.

In the manufacturing method and the manufacturing apparatus 100 for the composite material 400 described above, the second region 502 is placed in the portion 352 of the cavity 350 where the resin 600 does not easily flow. Therefore, compared to a case where the adhesive 520 is uniformly applied to the carbon fiber 510, it is possible to allow the resin 600 to easily flow to the portion 352 where the resin 600 does not easily flow. As a result, compared to a case where the adhesive 520 is uniformly applied to the carbon fiber 510, it is possible to allow the resin 600 to reach the entire carbon fiber 510 inside the cavity 350 within a short time. As a result, it is possible to shorten the molding time and eliminate necessity remarkably increasing the maximum injection pressure $P_1$. Therefore, it is possible to reduce the equipment cost.

The adhesive 520 is applied such that the content density of the adhesive 520 decreases from the first wall surface 310a of the injection port 313 side of the cavity 350 toward the second wall surface 310b of the side opposite to the injection port 313. As a result, the flowing velocity of the resin 600 can be delayed by increasing the flowing resistance of the resin 600 in the vicinity of the injection port 313. Therefore, it is possible to suppress misalignment of the orientation of the carbon fiber 510 in the vicinity of the injection port 313. In addition, it is possible to suppress a wrinkle or twist of the carbon fiber 510 by reducing a difference of the flowing velocity of the resin 600 between the layers of the carbon fibers 510. Therefore, it is possible to improve a strength and, design of the composite material 400.

The adhesive 520 is formed of a thermosoftening material. Therefore, the adhesive 520 is softened by the reactive heat caused by curing of the resin 600 and/or the heat of the mold 310 by heating the mold 310 after injecting the resin 600 into the cavity 350. As a result, the resin 600 is infused into the carbon fiber 510 of the portion where the adhesive 520 is softened during the molding of the composite material 400. Therefore, it is possible to mold a high quality composite material 400 in which the resin 600 is nearly uniformly infused into the entire carbon fiber 510.

A laminating process for forming the laminate 510b by laminating the carbon fibers 510 applied with the adhesive 520 is further provided between the applying process and the preforming process. As a result, the carbon fibers 510 can be delivered to the preforming process while they are bonded with the adhesive 520. Therefore, it is possible to suppress a deviation of the arrangement of the carbon fibers 510.

The resin 600 is formed of epoxy resin, and the adhesive 520 is formed of low-molecular-weight epoxy resin. As a result, since the resin 600 and the adhesive 520 are formed of the similar material for the molding of the composite material 400, it is possible to suppress formation of an interface between the resin 600 and the adhesive 520 and mold a more homogeneous composite material 400.

In the preform 500 according to this embodiment, the second region 502 of the carbon fiber 510 is formed to have a content density of the adhesive 520 lower than that of the first region 501 of the carbon fiber 510. By placing the second region 502 in the portion 352 of the cavity 350 where the resin 600 does not easily flow when the preform 500 is placed in the cavity 350, it is possible to reduce the flowing resistance of the resin 600 and allow the resin 600 to easily flow in the portion 352 where the resin 600 does not easily flow. Therefore, it is possible to shorten the molding time of the composite material 400.

The adhesive 520 is formed of a thermosoftening material. As a result, it is possible to infuse the resin 600 into the carbon fiber 510 in the portion where the adhesive 520 is softened when the composite material 400 is molded using the preform 500. Therefore, it is possible to mold a high quality composite material 400 in which the resin 600 is nearly uniformly infused to the entire carbon fiber 510.

While the manufacturing method for the composite material, the manufacturing apparatus, and the composite material have been described throughout the embodiments hereinbefore, the invention is not limited to the configurations described in the embodiments, and may be suitably changed on the basis of the claims.

For example, although the heating process is carried out before the cutting process, it may be carried out after the cutting process or the lamination process as well.

Although the laminate is formed by laminating a plurality of layers of the reinforcements, the composite material may be formed from a single reinforcement.

Although the composite material has the core material, the composite material may not have the core material.

REFERENCE SIGNS LIST

100 Manufacturing apparatus
110 Control unit
200 Preforming apparatus
220 Applying unit
260 Preform die
300 Molding apparatus
310 Mold
310a First wall surface 310b Second wall surface
313 Injection port
340 Mold temperature adjustment unit
350 Cavity
400 Composite material
500 Preform (preform for a composite material)
501 First region
502 Second region
510 Carbon fiber (reinforcement)
510b Laminate
520 Adhesive
530 Core material
600 Resin

The invention claimed is:

1. A manufacturing method for a composite material provided with a sheet-shaped reinforcement and resin infused into the sheet-shaped reinforcement, comprising:
  applying an adhesive to a sheet-shaped reinforcement having a first region and a second region such that a content density of the adhesive is lower in the second region than in the first region;
  curing or partially curing the adhesive applied to the sheet-shaped reinforcement;
  forming a preform by preforming the sheet-shaped reinforcement to have a three-dimensional shape;
  placing the preform in a cavity of a mold such that the first region is placed closer to an injection port of the mold than the second region; and
  injecting resin into the cavity from the injection port of the mold to infuse the resin into the preform,
  wherein curing or partially curing the adhesive occurs after applying the adhesive to the sheet-shaped reinforcement and before forming the preform by preforming the sheet-shaped reinforcement.

2. The manufacturing method for the composite material according to claim 1, wherein the adhesive is applied such that the content density of the adhesive decreases from a first wall surface of an injection port side of the mold toward a second wall surface opposite to the injection port.

3. The manufacturing method for the composite material according to claim 1, wherein the adhesive is formed of a thermosoftening material,
  the mold is heated after the resin is injected into the cavity, and
  the adhesive is softened by a reactive heat caused by curing of the resin and/or heat of the mold.

4. The manufacturing method for the composite material according to claim 1, wherein the resin is formed of a first epoxy resin, and
  the adhesive is formed of a second epoxy resin having a low-molecular-weight.

5. The manufacturing method for the composite material according to claim 1, wherein a temperature of the adhesive applied to the sheet-shaped reinforcement is controlled to be 50 to 70° C. during curing or partially curing of the adhesive.

6. The manufacturing method for the composite material according to claim 1, wherein forming the preform comprises using a preform die to form the preform by preforming the sheet-shaped reinforcement, and a temperature of the preform die is lower than a temperature of the adhesive applied to the sheet-shaped reinforcement.

7. The manufacturing method for the composite material according to claim 1, wherein forming the preform comprises using a preform die to form the preform by preforming the sheet-shaped reinforcement, and a temperature of the preform die is controlled to be 20 to 40° C.

8. The manufacturing method for the composite material according to claim 1, wherein:
  the adhesive comprises one of: a polyolefin resin, a styrene-based resin, a nylon resin, a polyurethane resin, or a thermosetting resin; and
  the resin comprises an epoxy resin or a phenol resin.

9. A manufacturing apparatus for a composite material comprising:
  an applicator configured to apply an adhesive to a sheet-shaped reinforcement having a first region and a second region;
  a heater configured to heat the adhesive applied to the sheet-shaped reinforcement;
  a preform die configured to form a preform by preforming the sheet-shaped reinforcement to have a three-dimensional shape;
  a mold comprising a cavity configured to receive the preform and an injection port configured to inject a resin into the cavity,
  wherein the first region is placed closer to the injection port of the mold than the second region while the preform is in the cavity of the mold; and
  a controller configured to control operation of the applicator, the heater, and the preform die such that, after placing the preform in the mold, a content density of the adhesive is lower in the second region than in the first region, and
  wherein the manufacturing apparatus is configured to cure or partially cure the adhesive applied to the sheet-shaped reinforcement after the adhesive is applied to the sheet-shaped reinforcement by the applicator and before the preform is formed by the preform die.

10. The manufacturing apparatus for the composite material according to claim 9, wherein the mold has a first wall surface on an injection port side of the mold and a second wall surface on a side opposite to the injection port, and
  the controller controls the applicator such that the content density of the adhesive decreases from the first wall surface to the second wall surface.

11. The manufacturing apparatus for the composite material according to claim 9, further comprising a mold temperature adjustment device comprising an electric heater configured to adjust a temperature of the mold,
  wherein the controller is configured to control operation of the mold temperature adjustment device such that the mold is heated,
  the adhesive is formed of a thermosoftening material, and
  the adhesive is softened by a reactive heat caused by curing of the resin and/or heat of the mold.

12. The manufacturing apparatus for the composite material according to claim 9, wherein the resin is formed of a first epoxy resin, and
  the adhesive is formed of a second epoxy resin having a low-molecular-weight.

13. The manufacturing apparatus for the composite material according to claim 9, wherein a temperature of the adhesive applied to the sheet-shaped reinforcement is 50 to 70° C. during curing or partial curing of the adhesive.

14. The manufacturing apparatus for the composite material according to claim 9, wherein a temperature of the preform die is lower than a temperature of the adhesive applied to the sheet-shaped reinforcement.

15. The manufacturing apparatus for the composite material according to claim 9, wherein a temperature of the preform die is 20 to 40° C.

16. The manufacturing apparatus for the composite material according to claim 9, wherein:

the adhesive comprises one of: a polyolefin resin, a styrene-based resin, a nylon resin, a polyurethane resin, or a thermosetting resin; and the resin comprises an epoxy resin or a phenol resin.

* * * * *